United States Patent
Chang et al.

(10) Patent No.: US 12,004,081 B2
(45) Date of Patent: Jun. 4, 2024

(54) COMMUNICATION METHOD AND DEVICE

(71) Applicant: HUAWEI TECHNOLOGIES CO., LTD., Shenzhen (CN)

(72) Inventors: Junren Chang, Beijing (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 566 days.

(21) Appl. No.: 17/206,497

(22) Filed: Mar. 19, 2021

(65) Prior Publication Data

US 2021/0211982 A1    Jul. 8, 2021

Related U.S. Application Data

(63) Continuation of application No. PCT/CN2019/105036, filed on Sep. 10, 2019.

(30) Foreign Application Priority Data

Sep. 20, 2018  (CN) .......................... 201811103447.6

(51) Int. Cl.
*H04W 52/00*    (2009.01)
*H04L 5/00*    (2006.01)
(Continued)

(52) U.S. Cl.
CPC ....... *H04W 52/0229* (2013.01); *H04L 5/0098* (2013.01); *H04W 24/08* (2013.01); *H04W 52/0277* (2013.01); *H04W 72/23* (2023.01)

(58) Field of Classification Search
CPC ......... H04W 52/0229; H04W 52/0277; H04W 24/08; H04W 72/23; H04L 5/0098
See application file for complete search history.

(56) References Cited

U.S. PATENT DOCUMENTS

2015/0201375 A1* 7/2015 Vannithamby ........ H04W 16/18
370/311
2018/0255515 A1    9/2018 Gupta Hyde et al.

FOREIGN PATENT DOCUMENTS

CN    101488832 A    7/2009
CN    101931493 A    12/2010
(Continued)

OTHER PUBLICATIONS

Ericsson, Wake-up signal for NB-IOT and eMTC, 3GPP TSG-RAN WG2 #100, R2-1713033, Reno, NV, USA, Nov. 27-Dec. 1, 2017, 9 Pages.

(Continued)

*Primary Examiner* — Erika A Washington
(74) *Attorney, Agent, or Firm* — HAUPTMAN HAM, LLP

(57) ABSTRACT

A communication method includes: when a network device meets an enabling condition, sending, by the network device, configuration information to a terminal, where the configuration information includes at least one of a type of indication information, a form of the indication information, or a receiving location of the indication information; and sending the indication information to the terminal, where the indication information is used to indicate the terminal whether to monitor a physical downlink control channel PDCCH, or indicate the terminal to monitor a PDCCH, or indicate the terminal not to monitor a PDCCH; or the indication information is used to indicate the terminal whether to receive a physical downlink shared channel PDSCH, or indicate the terminal to receive a PDSCH, or indicate the terminal not to receive a PDSCH. This improves flexibility of using the indication information (for example, a UPSS) by the terminal.

20 Claims, 7 Drawing Sheets

(51) Int. Cl.
  *H04W 24/08* (2009.01)
  *H04W 52/02* (2009.01)
  *H04W 72/23* (2023.01)

(56) References Cited

FOREIGN PATENT DOCUMENTS

| CN | 108270514 A | 7/2018 | | |
|---|---|---|---|---|
| EP | 3808135 A1 | 4/2021 | | |
| EP | 3840483 A1 | * 6/2021 | ........ | H04W 52/0212 |
| WO | 2012036502 A2 | 3/2012 | | |
| WO | 2012036502 A3 | 5/2012 | | |
| WO | WO-2018228531 A1 | * 12/2018 | ........ | H04W 52/0203 |

OTHER PUBLICATIONS

Ericsson, Wake-up signal configurations and procedures for NB-IOT, 3GPP TSG-RAN WG1 Meeting #93, R1-1805855 Busan, Korea, May 20-24, 2018, 9 Pages.
Ericsson, Wake-up signal configurations and procedures for NB-IOT, 3GPP TSG-RAN WG1 Meeting #92, R1-1801489, Athens, Greece, Feb. 26-Mar. 2, 2018, 9 Pages.
Ericsson, Downlink channel power efficiency for MTC, 3GPP TSG-RAN WG1 #89, R1-1706882, Hangzhou, P.R. China May 15-19, 2017, 5 Pages.
3GPP TS 38.321 V15.2.0 (Jun. 2018), 3rd Generation Partnership Project; Technical Specification Group Radio Access Network; NR; Medium Access Control (MAC) protocol specification (Release 15), 73 Pages.
3GPP TS 38.331 V15.2.1 (Jun. 2018), 3rd Generation Partnership Project; Technical Specification Group Radio Access Network; NR; Radio Resource Control (RRC) protocol specification (Release 15), 303 Pages.
CATT, CMCC, vivo, CATR, Qualcomm, MediaTek, New SID: Study on UE Power Saving in NR, 3GPP TSG RAN Meetings #80, RP-181463, La Jolla, USA, Jun. 11-14, 2018, 5 Pages.
Chinese Office Action issued in corresponding Chinese Application No. 201811103447.6, dated Aug. 18, 2018, pp. 1-11.
International Search Report issued in corresponding International Application No. PCT/CN2019/105036, dated Dec. 2, 2019, pp. 1-10.
ERICSSON: Wake up signal for NB IoTandeMTC 3GPP Draft; R2 1713033 3rd Generation Partnership Project (3GPP) Mobile Competence Centre;650 Route Des Lucioles;F-06921 Sophia-Anti Polis Cedex;Francevol .RAN WG2 No. Reno NU USA;Nov. 27, 2017 Dec. 1, 2017,Nov. 17, 2017 (Nov. 17, 2017) XP051371863.
Extended European Search Report issued in corresponding European Application No. 19862757.2, dated Oct. 8, 2021, pp. 1-11, European Patent Office, Munich, Germany.
RP-181463, CATT et al., New SID: Study on UE Power Saving in NR, 3GPP TSG RAN Meetings #80, La Jolla, USA, Jun. 11-14, 2018, total 5 pages.
3GPP TS 38.331 V15.2.1 (Jun. 2018), 3rd Generation Partnership Project; Technical Specification Group Radio Access Network;NR; Radio Resource Control (RRC) protocol specification(Release 15), total 303 pages.
3GPP TS 38.321 V15.2.0 (Jun. 2018), 3rd Generation Partnership Project; Technical Specification Group Radio Access Network;NR;Medium Access Control (MAC) protocol specification(Release 15), total 73 pages.

\* cited by examiner

COMMUNICATION METHOD AND DEVICE

CROSS-REFERENCE TO RELATED APPLICATIONS

This application is a continuation of International Application No. PCT/CN2019/105036, filed on Sep. 10, 2019, which claims priority to Chinese Patent Application No. 201811103447.6, filed on Sep. 20, 2018, the disclosures of the aforementioned applications are hereby incorporated by reference in their entireties.

TECHNICAL FIELD

This application relates to the field of communications technologies, and in particular, to a communication method and a device.

BACKGROUND

In the field of communications technologies, reducing power consumption of a terminal helps improve a battery life of the terminal, thereby improving user experience. In the conventional technology, a network device mainly configures a discontinuous reception (Discontinuous Reception, DRX for short) mechanism for terminals in a connected state, an idle state, and an inactive (inactive) state, to reduce power consumption of the terminals.

Currently, in the DRX mechanism, there are mainly two types of user power saving signals (user power saving signal, UPSS for short), and the two types of signals are a wake-up signal (Wakeup Signal, WUS for short) and a go-to-sleep signal (Go-to-sleep Signal, GTS for short) respectively. Specifically, when the terminal sends a UPSS, if the terminal is in the idle state, the terminal may send the UPSS before paging, so that the terminal monitors a PDCCH or the terminal enters a sleep state (herein, the sleep state may be understood as not monitoring a PDCCH). Alternatively, a UPSS is indicated by using existing paging DCI, so that the terminal receives a PDSCH or the terminal enters a sleep state (herein, the sleep state may be understood as not receiving a PDSCH). When the terminal is in the connected state and is configured with the DRX mechanism, the terminal may send the UPSS before an on-duration, or may send the UPSS during the on-duration, so that the terminal may also enter a wake-up state or the sleep state. The on-duration refers to a time period during which the terminal waits for receiving a physical downlink control channel (Physical downlink control channel, PDCCH for short) message after being woken up.

Therefore, in an existing communication manner, the terminal is always in a state in which a terminal power saving mechanism is used. However, actually, the terminal does not need to always use the terminal power saving mechanism. Therefore, use of the UPSS by the terminal is less flexible.

SUMMARY

This application provides a communication method and a device, to improve flexibility of using a UPSS by a terminal.

According to a first aspect, a communication method is provided. The communication method includes: when a network device meets an enabling condition, sending, by the network device, configuration information to a terminal, where the configuration information includes at least one of a type of indication information, a form of the indication information, or a receiving location of the indication information; and sending, by the network device, the indication information to the terminal, where the indication information is used to indicate the terminal whether to monitor a physical downlink control channel PDCCH, or indicate the terminal to monitor a PDCCH, or indicate the terminal not to monitor a PDCCH; or the indication information is used to indicate the terminal whether to receive a physical downlink shared channel PDSCH, or indicate the terminal to receive a PDSCH, or indicate the terminal not to receive a PDSCH.

In the solution provided in this application, when determining that the network device meets the enabling condition, the network device sends UPSS configuration information to the terminal, so that the terminal activates a UPSS configuration after receiving the UPSS configuration information. After determining that the terminal has activated the UPSS configuration, the network device may determine, based on a service arrival status, a service delay requirement, a UE power saving policy, or the like, whether to send a UPSS to the terminal. Correspondingly, when the network device determines to send the UPSS to the terminal, the terminal may determine whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

In a possible implementation, when the indication information is a wake-up signal WUS, the indication information is used to indicate the terminal whether to monitor the PDCCH, or indicate the terminal to monitor the PDCCH; or is used to indicate the terminal whether to receive the PDSCH, or indicate the terminal to receive the PDSCH; or when the indication information is a go-to-sleep signal GTS, the indication information is used to indicate the terminal whether to monitor the PDCCH, or indicate the terminal not to monitor the PDCCH; or is used to indicate the terminal whether to receive the PDSCH, or indicate the terminal not to receive the PDSCH. Therefore, the terminal may perform a corresponding operation based on the type of the indication information.

In a possible implementation, that the network device meets the enabling condition includes:
  when receiving a configuration request sent by the terminal, the network device determines that the network device meets the enabling condition; and/or
  when a service feature meets a preset condition, the network device determines that the network device meets the enabling condition, where the service feature includes a service sending frequency and/or terminal power consumption generated by a service.

In the solution of this application, the network device determines, depending on whether the configuration request sent by the terminal is received or whether the service feature meets the preset condition, whether to send the configuration information to the terminal. After determining to send the configuration information, the terminal activates the configuration, and determines, depending on whether the indication information sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the indication information (for example, a UPSS) by the terminal.

In a possible implementation, when the enabling condition met by the network device includes that the configuration request sent by the terminal is received, the configuration request further includes an activation manner of a configuration; and the sending configuration information to a terminal includes:

determining, by the network device, a target activation manner based on the activation manner of the configuration, or the activation manner of the configuration and other information, where the other information includes a status of an available network resource; and sending, by the network device, the configuration information to the terminal, where the configuration information is further used to indicate the terminal to activate a configuration based on the target activation manner.

In the solution of this application, the terminal may autonomously request the configuration information, and add, to the configuration information, an activation manner that the terminal intends to use, so that the network device performs acknowledgment. After performing the acknowledgment, the network device may send an acknowledged target activation manner to the terminal, so that the terminal activates a configuration based on the target activation manner.

In a possible implementation, the configuration information includes an activation manner of a configuration, and the configuration information is used to indicate the terminal to activate a configuration based on the activation manner of the configuration.

In a possible implementation, the activation manner of the configuration includes: after receiving a configuration, the terminal immediately activates the configuration; after receiving a configuration, the terminal activates the configuration after a preset duration; or after receiving a configuration, the terminal periodically activates the configuration.

In the solution of this application, before the terminal activates the configuration, the network device may determine, based on an actual status of the network device, an activation manner that needs to be used by the terminal to activate the configuration, and send the configuration information including the activation manner of the configuration to the terminal. In this way, after the terminal receives the configuration information, the configuration may be activated based on the activation manner of the configuration indicated by the network device.

In a possible implementation, the method further includes:

sending, by the network device, a configuration activation indication to the terminal, where the configuration activation indication is used to indicate the terminal to activate a configuration.

In the solution of this application, before the terminal activates the configuration, the network device may determine, based on an actual status of the network device, whether to send the configuration activation indication to the terminal. After the network device determines to send the configuration activation indication to the terminal, the terminal may activate the configuration based on the configuration activation indication sent by the network device after receiving the configuration activation indication.

In a possible implementation, before the sending, by the network device, the indication information to the terminal, the method further includes:

receiving, by the network device, a signal request sent by the terminal, where the signal request is used to indicate the network device to send the indication information.

In the solution of this application, the terminal may autonomously determine, based on a power consumption state of the terminal, whether to send the signal request to the network device. After the terminal determines to send the signal request to the network device, the network device sends the indication information to the network device based on the signal request after receiving the signal request. In this way, the terminal autonomously triggers the network device to send the indication information.

In a possible implementation, the configuration request may be carried in any one of a message MSG1, a message MSG3, a radio resource control RRC connection setup request message, or an RRC connection resume request message, that is, the configuration request may be sent to the network device in a plurality of sending manners. This makes sending manners of the configuration requests more diverse.

In a possible implementation, the configuration information may be carried in any one of a random access response RAR message, a message MSG4, a radio resource control RRC connection setup message, an RRC connection resume message, or an RRC connection reconfiguration message, that is, the configuration information may be sent to the terminal in a plurality of sending manners. This makes sending manners of the configuration information more diverse.

According to a second aspect, a communication method is provided. The communication method includes: receiving, by a terminal, configuration information sent by a network device, where the configuration information includes at least one of a type of indication information, a form of the indication information, or a receiving location of the indication information; activating, by the terminal, a configuration; and determining, by the terminal depending on whether the indication information sent by the network device is received, whether to monitor a physical downlink control channel PDCCH, or determining to monitor a PDCCH, or determining not to monitor a PDCCH; or determining whether to receive a physical downlink shared channel PDSCH, or determining to receive a PDSCH, or determining not to receive a PDSCH.

In the solution provided in this application, when determining that the network device meets an enabling condition, the network device sends UPSS configuration information to the terminal, so that the terminal activates a UPSS configuration after receiving the UPSS configuration information. After determining that the terminal has activated the UPSS configuration, the network device may determine, based on a service arrival status, a service delay requirement, a UE power saving policy, or the like, whether to send a UPSS to the terminal. Correspondingly, when the network device determines to send the UPSS to the terminal, the terminal may determine, depending on whether the UPSS sent by the network device is received, whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

In a possible implementation, when the indication information is a wake-up signal WUS, the indication information is used to indicate the terminal whether to monitor the PDCCH, or indicate the terminal to monitor the PDCCH; or is used to indicate the terminal whether to receive the PDSCH, or indicate the terminal to receive the PDSCH; or when the indication information is a go-to-sleep signal GTS, the indication information is used to indicate the terminal whether to monitor the PDCCH, or indicate the terminal not to monitor the PDCCH; or is used to indicate the terminal whether to receive the PDSCH, or indicate the terminal not to receive the PDSCH. Therefore, the terminal may perform a corresponding operation based on the type of the indication information.

In a possible implementation, the configuration information is sent after the network device meets an enabling condition, and that the network device meets the enabling condition includes:
the network device receives a configuration request sent by the terminal; and/or a service feature meets a preset condition, where the service feature includes a service sending frequency and/or terminal power consumption generated by a service.

In the solution of this application, the network device determines, depending on whether the configuration request sent by the terminal is received or whether the service feature meets the preset condition, whether to send the configuration information to the terminal. After determining to send the configuration information, the terminal activates the configuration, and determines, depending on whether the indication information sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the indication information (for example, a UPSS) by the terminal.

In a possible implementation, when the enabling condition met by the network device includes that the network device receives the configuration request sent by the terminal, the configuration request further includes an activation manner of a configuration, and the configuration request is further used to indicate the network device to determine a target activation manner based on the activation manner of the configuration, or the activation manner of the configuration and other information, where the other information includes a status of an available network resource; and
correspondingly, the receiving, by a terminal, configuration information sent by a network device further includes:
receiving, by the terminal, the configuration information sent by the network device, where the configuration information is further used to indicate the terminal to activate the configuration based on the target activation manner.

In the solution of this application, the terminal may autonomously request the configuration information, and add, to the configuration information, an activation manner that the terminal intends to use, so that the network device performs acknowledgment. After performing the acknowledgment, the network device may send an acknowledged target activation manner to the terminal, so that the terminal activates a configuration based on the target activation manner.

In a possible implementation, the configuration information includes an activation manner of a configuration, and the activating, by the terminal, a configuration includes:
activating, by the terminal, the configuration based on the activation manner of the configuration.

In a possible implementation, the activation manner of the configuration includes: after receiving a configuration, the terminal immediately activates the configuration; after receiving a configuration, the terminal activates the configuration after a preset duration; or after receiving a configuration, the terminal periodically activates the configuration.

In the solution of this application, before the terminal activates the configuration, the network device may determine, based on an actual status of the network device, an activation manner that needs to be used by the terminal to activate the configuration, and send the configuration information including the activation manner of the configuration to the terminal. In this way, after the terminal receives the configuration information, the configuration may be activated based on the activation manner of the configuration indicated by the network device.

In a possible implementation, the activating, by the terminal, a configuration includes:
receiving, by the terminal, a configuration activation indication sent by the network device; and
activating, by the terminal, the configuration based on the configuration activation indication.

In the solution of this application, before the terminal activates the configuration, the network device may determine, based on an actual status of the network device, whether to send the configuration activation indication to the terminal. After the network device determines to send the configuration activation indication to the terminal, the terminal may activate the configuration based on the configuration activation indication sent by the network device after receiving the configuration activation indication.

In a possible implementation, the activating, by the terminal, a configuration includes:
once the terminal receives a configuration activation indication sent by the network device, or a duration after the terminal receives the configuration information reaches a preset duration, activating the configuration, so that the terminal may activate the configuration in both the manners.

In a possible implementation, after the activating, by the terminal, a configuration, the method further includes:

sending, by the terminal, a signal request to the network device, where the signal request is used to indicate the network device to send the indication information.

In the solution of this application, the terminal may autonomously determine, based on a power consumption state of the terminal, whether to send the signal request to the network device. After the terminal determines to send the signal request to the network device, the network device sends the indication information to the network device based on the signal request after receiving the signal request. In this way, the terminal autonomously triggers the network device to send the indication information.

In a possible implementation, the configuration request may be carried in any one of a message MSG1, a message MSG3, a radio resource control RRC connection setup request message, or an RRC connection resume request message, that is, the configuration request may be sent to the network device in a plurality of sending manners. This makes sending manners of the configuration requests more diverse.

In a possible implementation, the configuration information may be carried in any one of a random access response RAR message, a message MSG4, a radio resource control RRC connection setup message, an RRC connection resume message, or an RRC connection reconfiguration message, that is, the configuration information may be sent to the terminal in a plurality of sending manners. This makes sending manners of the configuration information more diverse.

According to a third aspect, a network device is provided. The network device is configured to perform the communication method according to any one of the first aspect or the possible implementations of the first aspect. Specifically, the network device may include modules configured to perform the communication method according to any one of the first aspect or the possible implementations of the first aspect.

According to a fourth aspect, a network device is provided. The network device includes a memory and a processor, the memory is configured to store an instruction, the processor is configured to execute the instruction stored in the memory, and execution of the instruction stored in the memory enables the processor to perform the method according to any one of the first aspect or the possible implementations of the first aspect.

According to a fifth aspect, a computer-readable storage medium is provided. The computer-readable storage medium stores a computer program, and when the program is executed by a processor, the method according to any one of the first aspect or the possible implementations of the first aspect is performed.

According to a sixth aspect, a terminal is provided. The terminal is configured to perform the communication method according to any one of the second aspect or the possible implementations of the second aspect. Specifically, the terminal may include modules configured to perform the communication method according to any one of the second aspect or the possible implementations of the second aspect.

According to a seventh aspect, a terminal is provided. The terminal includes a memory and a processor, the memory is configured to store an instruction, the processor is configured to execute the instruction stored in the memory, and execution of the instruction stored in the memory enables the processor to perform the method according to any one of the second aspect or the possible implementations of the second aspect.

According to an eighth aspect, a computer-readable storage medium is provided. The computer-readable storage medium stores a computer program, and when the program is executed by a processor, the method according to any one of the second aspect or the possible implementations of the second aspect is performed.

According to the communication method and the device provided in this application, when determining that the network device meets the enabling condition, the network device sends UPSS configuration information to the terminal, so that the terminal activates a UPSS configuration after receiving the UPSS configuration information. After determining that the terminal has activated the UPSS configuration, the network device may determine, based on a service arrival status, a service delay requirement, a UE power saving policy, or the like, whether to send a UPSS to the terminal. Correspondingly, when the network device determines to send the UPSS to the terminal, the terminal may determine, depending on whether the UPSS sent by the network device is received, whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

DESCRIPTION OF EMBODIMENTS

Figure 1:
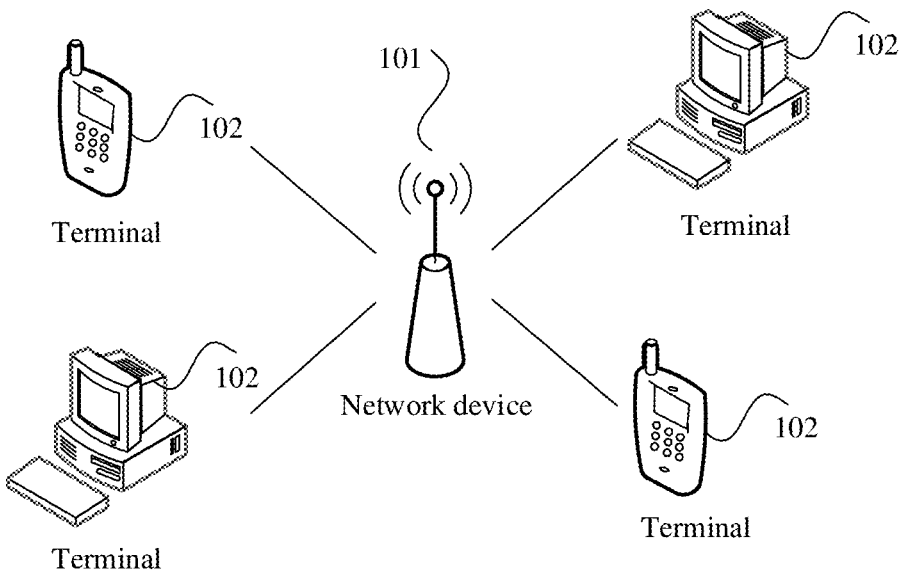
FIG. 1 is a schematic diagram of a system architecture according to an embodiment of the present invention.

The following describes the technical solutions in this application with reference to the accompanying drawings.

It should be understood that the technical solutions in the embodiments of the present invention may be used in a long term evolution (Long Term Evolution, LTE) architecture, or may be used in a universal mobile telecommunications system (Universal Mobile Telecommunications System, UMTS) terrestrial radio access network (UMTS Terrestrial Radio Access Network, UTRAN) architecture, or may be used in a global system for mobile communications (Global System for Mobile Communications, GSM)/enhanced data rate for GSM evolution (Enhanced Data Rate for GSM Evolution, EDGE) system radio access network (GSM EDGE Radio Access Network, GERAN) architecture. In the UTRAN architecture/the GERAN architecture, a function of an MME is completed by a serving general packet radio service (General Packet Radio Service, GPRS) support node (Serving GPRS Support Node, SGSN), and a function of an SGW/PGW is completed by a gateway GPRS support node (Gateway GPRS Support Node, GGSN). The technical solutions in the embodiments of the present invention may further be used in another communications system, such as a public land mobile network (Public Land Mobile Network, PLMN) system, or even a 5G communications system or a communications system after 5G. This is not limited in the embodiments of the present invention.

The embodiments of the present invention relate to a terminal. The terminal may be a device that has a wireless transceiver function and that may cooperate with a network device to provide a communication service for a user. Specifically, the terminal may be user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. For example, the terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicle-mounted device, a wearable device, or a terminal in a future 5G network or a network after 5G. This is not limited in the embodiments of the present invention.

The embodiments of the present invention further relate to a network device. The network device may be a device configured to communicate with the terminal. For example, the network device may be a base transceiver station (Base Transceiver Station, BTS) in a GSM system or a CDMA system, may be a NodeB (NodeB, NB) in a WCDMA system, or may be an evolved NodeB (evolved NodeB, eNB or eNodeB) in an LTE system. Alternatively, the network device may be a relay station, an access point, a vehicle-mounted device, a wearable device, a network-side device in a future 5G network or a network after 5G, or a network device in a future evolved PLMN network.

The network device in the embodiments of the present invention may also be referred to as a radio access network (Radio Access Network, RAN) device. The RAN device is connected to the terminal, and is configured to receive data from the terminal and send the data to a core network device. The RAN device corresponds to different devices in different communications systems, for example, in a 2G system, corresponds to a base station and a base station controller, in a 3G system, corresponds to a base station and a radio network controller (Radio Network Controller, RNC), in a 4G system, corresponds to an evolved NodeB (evolved NodeB, eNB), and in a 5G system, corresponds to an access network device (for example, a gNB, a CU, or a DU) in the 5G system such as a new radio access technology (New Radio Access Technology, NR) system.

FIG. 1 is a schematic diagram of a system architecture according to an embodiment of the present invention. The communications system may include a network device 101 and at least one terminal 102. The network device 101 may exchange information with the terminal 102. The network device 101 may send a UPSS to the terminal 102, so that after receiving the UPSS, the terminal 102 monitors a physical downlink control channel (Physical downlink control channel, PDCCH) or enters a sleep state based on the UPSS, causing the terminal 102 to be always in a state in which a UE power saving mechanism is used. Consequently, use of the UPSS by the terminal 102 is less flexible. To improve flexibility of using the UPSS by the terminal, an embodiment of this application provides a communication method. When determining that the network device meets an enabling condition, the network device sends configuration information to the terminal, so that the terminal activates a configuration after receiving the configuration information. After determining that the terminal has activated the configuration, the network device sends indication information to the terminal, so that the terminal may determine, depending on whether the indication information sent by the network device is received, whether to monitor a physical downlink control channel PDCCH, or determine to monitor a PDCCH, or determine not to monitor a PDCCH, or determine whether to receive a physical downlink shared channel PDSCH, or determine to receive a PDSCH, or determine not to receive a PDSCH. Compared with a terminal in the conventional technology, the terminal is not always in a state in which a UE power saving mechanism is used. However, when determining that the network device meets the enabling condition, the network device sends the configuration information to the terminal, so that the terminal activates the configuration only after receiving the configuration information, and determines, depending on whether the indication information sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the indication information (for example, a UPSS) by the terminal.

Before the embodiments of this application are described, several concepts in this application are first explained. The configuration information may be UPSS configuration information. When the configuration information is the UPSS configuration information, the UPSS configuration information may include at least one of a type of the UPSS, a form of the UPSS, or a receiving location of the UPSS. Correspondingly, the indication information sent by the network device to the terminal may be a UPSS. The following clearly and describes the technical solutions in the embodiments of the present invention with reference to the accompanying drawings in the embodiments of the present invention by using an example in which the configuration information is the UPSS configuration information.

Figure 2:
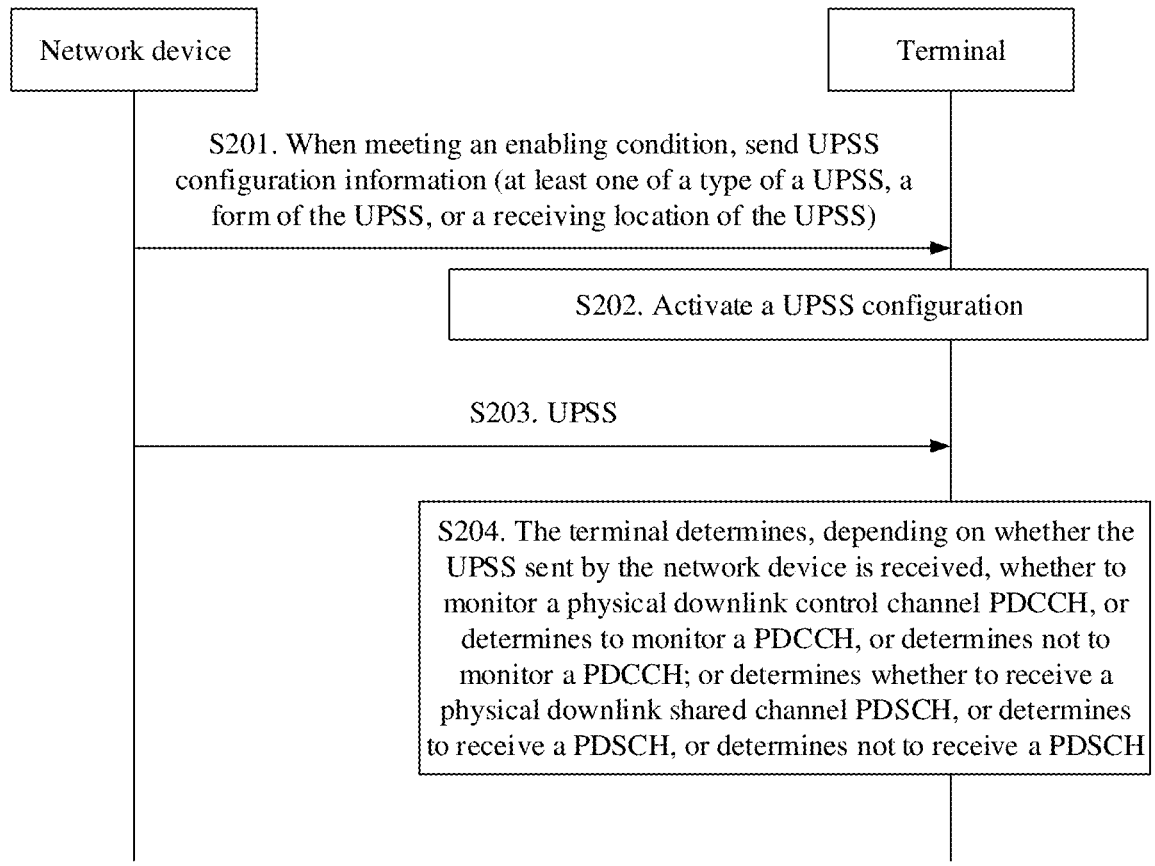
FIG. 2 is a schematic flowchart of a communication method according to an embodiment of the present invention.

FIG. 2 is a schematic flowchart of a communication method according to an embodiment of the present invention. A network device described in FIG. 2 may correspond to the network device 101 shown in FIG. 1, and a terminal described in FIG. 2 may correspond to the terminal 102 shown in FIG. 1. For example, referring to FIG. 2, the communication method may include the following steps.

S201. When a network device meets an enabling condition, the network device sends UPSS configuration information to a terminal.

The UPSS configuration information may include at least one of a type of a UPSS, a form of the UPSS, or a receiving location of the UPSS. In other words, the UPSS configuration information may include only any one of the type of the UPSS, the form of the UPSS, or the receiving location of the UPSS, or may include any two of the type of the UPSS, the form of the UPSS, or the receiving location of the UPSS. Certainly, alternatively, the type of the UPSS, the form of the UPSS, and the receiving location of the UPSS may all be included. Further, the type of the UPSS may be a WUS or a GTS. The form of the UPSS may be understood as an information indication manner used by the UPSS. For example, a specific physical layer signal or an existing physical signal (for example, DCI) may be used to represent the UPSS, or "1" or "0" of one bit in a specific or an existing MAC CE is used to respectively correspond to "yes" or "no" of one UPSS, or "0" or "1" of one bit in a specific or an existing MAC CE is used to respectively correspond to "yes" or "no" of one UPSS. The receiving location of the UPSS may be understood as being used to indicate the terminal to detect a time-frequency resource and/or a used scrambling code (or descrambling code) of the UPSS corresponding to the terminal.

It should be noted that in this embodiment of this application, when sending the UPSS configuration information to the terminal, the network device does not always send the UPSS configuration information to the terminal, but sends the UPSS configuration information to the terminal only when the network device meets the enabling condition. Optionally, that the network device determines that the network device meets the enabling condition may include: when receiving a configuration request sent by the terminal, the network device may determine that the network device meets the enabling condition; and/or when a service feature meets a preset condition, the network device may determine that the network device meets the enabling condition, where the service feature includes a service sending frequency and/or terminal power consumption generated by a service.

Specifically, the network device may determine, in at least three possible manners, that the network device meets the enabling condition. In Manner 1, the network device receives the configuration request sent by the terminal. To be specific, as long as the network device receives the configuration request sent by the terminal, it indicates that the network device meets the enabling condition, and the network device may send the UPSS configuration information to the terminal. In this way, enabling of a signal can meet a current state of the terminal, for example, meet a dynamic power saving requirement of the terminal. In Manner 2, the network device determines that the service feature meets the preset condition, where the preset condition may be understood as that the service sending frequency meets a specific threshold condition, for example, the preset condition is greater than or equal to a first threshold and/or is less than or equal to a second threshold, and/or the terminal power consumption generated by the service is greater than or equal to a third threshold. To be specific, as long as the network device determines that the service feature meets the preset condition, it indicates that the network device meets the enabling condition, and the network device may send the UPSS configuration information to the terminal. In this way, enabling of a signal can meet the service feature and/or a current load status of the network. The first threshold, the second threshold, and the third threshold may be specifically set based on an actual requirement. This is not specifically limited in this embodiment of this application. Both Manner 1 and Manner 2 may be incorporated in Manner 3. To be specific, the network device receives the configuration request sent by the terminal, and the service feature meets the preset condition. In other words, the network device determines that the configuration request sent by the terminal is received, and determines that the service feature meets the preset condition. In this case, the network device may send the UPSS configuration information to the terminal. In this way, enabling of a signal can meet a current state of the terminal, the service feature, and/or a current load status of the network. Certainly, when determining that the network device meets the enabling condition, the network device uses only the three possible manners as an example for description, but this does not mean that this embodiment of this application is limited thereto.

After determining, in the three possible manners, that the network device meets the enabling condition, the network device may send the UPSS configuration information to the terminal. Optionally, the UPSS configuration information may be carried in any one of a random access response (Random access response, RAR) message, a message MSG4, a radio resource control (Radio Resource Control, RRC) connection setup message, an RRC connection resume message, or an RRC connection reconfiguration message. That is, the UPSS configuration information may be carried in the RAR message and sent to the terminal, or may be carried in the message MSG4 and sent to the terminal, or may be carried in the RRC connection setup message and sent to the terminal, or may be carried in the RRC connection resume message and sent to the terminal. Certainly, the UPSS configuration information may alternatively be carried in the RRC connection reconfiguration message and sent to the terminal, so that the terminal obtains the configuration information by using the random access response RAR message, the message MSG4, the radio resource control RRC connection setup message, the RRC connection resume message, or the RRC connection reconfiguration message. Certainly, in this embodiment of this application, that the UPSS configuration information may be carried in the five messages is merely used as an example for description. Specifically, the UPSS configuration information may be set based on an actual requirement. This is not further limited in this embodiment of this application.

It should be noted that before the UPSS configuration information is carried in the five messages and sent to the terminal, if the network device determines that the network device receives the configuration request sent by the terminal, the UPSS configuration information may be carried in the five messages and sent to the terminal. Optionally, when the network device receives the configuration request sent by the terminal, the terminal may include the configuration request in any one of a message MSG1, a message MSG3, a radio resource control RRC connection setup request message, or an RRC connection resume request message. To be specific, the configuration request may be carried in the message MSG1 and sent to the network device, or may be carried in the message MSG3 and sent to the network device, or may be carried in the radio resource control RRC connection setup request message and sent to the network device. Certainly, the configuration request may alternatively be carried in the RRC connection resume request message and sent to the network device. For example, when the terminal includes the configuration request in the message MSG1 and sends the message MSG1 to the network device, correspondingly, after receiving the configuration request, the network device includes the UPSS configuration information in a random access response RAR message and sends the random access response RAR message to the terminal. When the terminal includes the configuration request in the message MSG3 and sends the message MSG3 to the network device, correspondingly, after receiving the configuration request, the network device includes the UPSS configuration information in a message MSG4 and sends the MSG4 to the terminal. When the terminal includes the configuration request in the radio resource control RRC connection setup request message and sends the radio resource control RRC connection setup request message to the network device, correspondingly, after receiving the configuration request, the network device includes the UPSS configuration information in a radio resource control RRC connection setup message and sends the radio resource control RRC connection setup message to the terminal. When the terminal includes the configuration request in the RRC connection resume request message and sends the RRC connection resume request message to the network device, correspondingly, after receiving the configuration request, the network device includes the UPSS configuration information in an RRC connection resume message and sends the RRC connection resume message to the terminal.

When determining that the network device meets the enabling condition, the network device may send the UPSS configuration information to the terminal, so that after receiving the UPSS configuration information, the terminal performs the following S202:

S202. The terminal activates a UPSS configuration.

Figure 3:
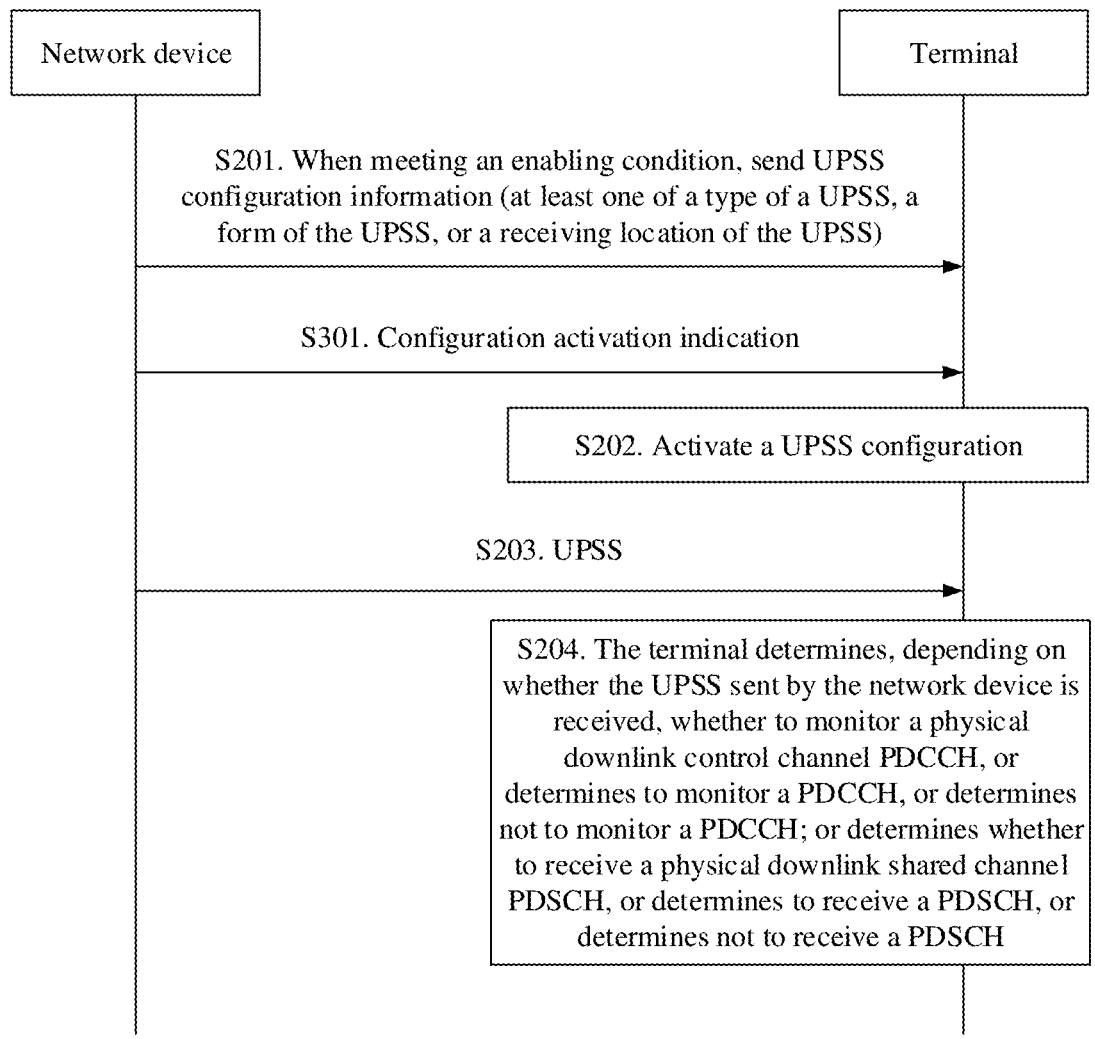
FIG. 3 is a schematic flowchart of another communication method according to an embodiment of the present invention.

After receiving the UPSS configuration information sent by the network device, the terminal may activate the UPSS configuration based on the UPSS configuration information. For example, optionally, when activating the UPSS configuration, the terminal may activate the UPSS configuration in at least four possible manners. The four possible manners are respectively as follows: Manner 1: After receiving the UPSS configuration information, the terminal immediately activates the UPSS configuration. Manner 2: After receiving the UPSS configuration information, the terminal activates the UPSS configuration after a preset duration. Manner 3: The terminal periodically activates the UPSS configuration. Manner 4: After receiving a configuration activation indication sent by the network device, the terminal activates the UPSS configuration. That after receiving the UPSS configuration information, the terminal immediately activates the UPSS configuration in Manner 1 may be understood as that the terminal activates the UPSS configuration as long as the terminal receives the UPSS configuration information sent by the network device. That after receiving the UPSS configuration information, the terminal activates the UPSS configuration after the preset duration in Manner 2 may be understood as that the terminal starts or restarts a timer after receiving the UPSS configuration information sent by the network device, and when the timer expires, the terminal activates the UPSS configuration, where the preset duration may be set based on an actual requirement. That the terminal periodically activates the UPSS configuration in Manner 3 may be understood as that after receiving the UPSS configuration information, the terminal intermittently activates the UPSS configuration in a period of T, and a duration for activating the UPSS configuration in each period T is t. A duration t may be implemented by setting a start point and an end point of the duration t. For example, the period T may be 120 s, or certainly, may be 130 S, and may be specifically set based on an actual requirement. That after receiving the configuration activation indication sent by the network device, the terminal activates the UPSS configuration in Manner 4 may be understood as that the terminal does not activate the UPSS configuration after receiving the UPSS configuration information, but activates the UPSS configuration after receiving the configuration activation indication (S301). For example, FIG. 3 is a schematic flowchart of another communication method according to an embodiment of the present invention. It should be noted that, in this embodiment of this application, the terminal may also determine to activate the UPSS configuration with reference to both Manner 2 in which after receiving the UPSS configuration information, the terminal activates the UPSS configuration after the preset duration and Manner 4 in which after receiving the configuration activation indication sent by the network device, the terminal activates the UPSS configuration. For example, the terminal may first determine whether the configuration activation indication is received, or whether a duration after the terminal receives the UPSS configuration information reaches a preset duration. Once the terminal receives the configuration activation indication sent by the network device, or once the duration after the terminal receives the UPSS configuration information reaches the preset duration, the terminal activates the UPSS configuration. That is, the UPSS configuration can be activated once the configuration activation indication sent by the network device is received, and it is unnecessary to determine whether the duration after the terminal receives the UPSS configuration information reaches the preset duration. Alternatively, once it is determined that the duration after the terminal receives the UPSS configuration information reaches the preset duration, the UPSS configuration can be activated, and it is also unnecessary to determine whether the configuration activation indication sent by the network device is received.

According to the foregoing description, it can be learned that after receiving the UPSS configuration information, the terminal may activate the UPSS configuration in the foregoing possible manners. In this case, another important problem in this embodiment of this application is how the terminal determines to active the UPSS configuration by using which one of Manner 1 in which after receiving the UPSS configuration information, the terminal immediately activates the UPSS configuration, Manner 2 in which after receiving the UPSS configuration information, the terminal activates the UPSS configuration after the preset duration, or Manner 3 in which the terminal periodically activates the UPSS configuration. Optionally, in this embodiment of this application, the terminal may determine, in the following three possible implementations, which activation manner is used to activate the UPSS configuration.

In a possible implementation, when the network device sends the UPSS configuration information to the terminal, the UPSS configuration information may include an activation manner of a configuration, so that the terminal can obtain the activation manner of the configuration. In this way, after the terminal receives the UPSS configuration information, the UPSS configuration may be activated based on the activation manner of the configuration included in the UPSS configuration information. The activation manner of the configuration may be that after receiving the UPSS configuration information, the terminal immediately activates the configuration; after receiving the UPSS configuration information, the terminal activates the configuration after a preset duration; or after receiving the UPSS configuration information, the terminal periodically activates the configuration. For example, when the activation manner of the configuration included in the UPSS configuration information is that after receiving the UPSS configuration information, the terminal immediately activates the UPSS configuration, after receiving the UPSS configuration information, the terminal immediately activates the UPSS configuration. When the activation manner of the configuration included in the UPSS configuration information is that after receiving the UPSS configuration information, the terminal activates the UPSS configuration after the preset duration, the terminal starts or restarts a timer when receiving the UPSS configuration information, and when the timer expires, the terminal activates the UPSS configuration. When the activation manner of the configuration included in the UPSS configuration information is that after receiving the UPSS configuration information, the terminal periodically activates the UPSS configuration, when receiving the UPSS configuration information, the terminal intermittently activates the UPSS configuration in a period of T, and a duration for activating the UPSS configuration in each period T is t.

In a second possible implementation, when the network device sends the configuration request to the terminal, the configuration request may include an activation manner of a configuration to the configuration request, so that the network device determines whether the terminal can use the activation manner of the configuration. After receiving the configuration request, the network device may determine a target activation manner based on the activation manner of the configuration, or based on the activation manner of the configuration and other information (for example, a status of an available network resource). The target activation manner may be consistent with the activation manner of the configuration in the configuration request, or may be inconsistent with the activation manner of the configuration in the configuration request. After determining the target activation manner, the network device sends the UPSS configuration information to the terminal. If the target activation manner is consistent with the activation manner of the configuration in the configuration request, the UPSS configuration information may include the target activation manner, so that after receiving the UPSS configuration information, the terminal activates the UPSS configuration based on the target activation manner included in the UPSS configuration information. Certainly, the UPSS configuration information may not include the target activation manner. When the UPSS configuration information does not include the target activation manner, after receiving the UPSS configuration information, the terminal determines that the network device can use, by default, the activation manner of the configuration included in the configuration request, and the terminal may activate the UPSS configuration based on the activation manner of the configuration included in the configuration request. On the contrary, if the target activation manner is inconsistent with the target activation manner in the configuration request, the UPSS configuration information needs to include the target activation manner, so that after receiving the UPSS configuration information, the terminal activates the UPSS configuration based on the target activation manner included in the UPSS configuration information.

In a third possible implementation, the network device may preset an activation manner of a configuration for the terminal. In this way, after receiving the UPSS configuration information sent by the network device, the terminal may directly activate the UPSS configuration based on the preset activation manner. For example, when the preset activation manner of the configuration is that after receiving the UPSS configuration information, the terminal immediately activates the UPSS configuration, after receiving the UPSS configuration information, the terminal immediately activates the UPSS configuration. When the preset activation manner of the configuration is that after receiving the UPSS configuration information, the terminal activates the UPSS configuration after a preset duration, the terminal starts or restarts a timer when receiving the UPSS configuration information, and when the timer expires, the terminal activates the UPSS configuration. When the preset activation manner of the configuration is that the terminal periodically activates the UPSS configuration, when receiving the UPSS configuration information, the terminal intermittently activates the UPSS configuration information in a period of T, and a duration for activating the UPSS configuration in each period T is t.

It should be noted that when the terminal activates the UPSS configuration in the foregoing several possible implementations, the activation manner of the configuration used by the terminal is sent by the network device to the terminal, or the activation manner of the configuration used by the terminal is reviewed and confirmed by the network device, or the activation manner of the configuration used by the terminal is preset by the network device for the terminal. Therefore, after sending the UPSS configuration information to the terminal, the network device may learn of a manner used by the terminal to activate the UPSS configuration. Therefore, after the terminal activates the UPSS configuration, the network device also determines, based on the activation manner of the configuration used by the terminal, whether the terminal has activated the UPSS configuration. After determining that the terminal has activated the UPSS configuration, the network device performs the following S203:

S203. The network device sends a UPSS to the terminal.

When indication information is a wake-up signal WUS, the indication information is used to indicate the terminal whether to monitor a PDCCH, or indicate the terminal to monitor a PDCCH; or is used to indicate the terminal whether to receive a PDSCH, or indicate the terminal to receive a PDSCH; or when indication information is a go-to-sleep signal GTS, the indication information is used to indicate the terminal whether to monitor a PDCCH, or indicate the terminal not to monitor a PDCCH; or is used to indicate the terminal whether to receive a PDSCH, or indicate the terminal not to receive a PDSCH.

It should be noted that in this step, when sending the UPSS to the terminal, the network device does not always send the UPSS to the terminal, but determines, based on a service arrival status, a service delay requirement, a UE power saving policy, or the like, whether to send the UPSS. Correspondingly, when the network device determines to send the UPSS to the terminal, the terminal may perform the following S204:

S204. The terminal determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH.

After the network device sends the UPSS to the terminal in S203, correspondingly, the terminal needs to determine whether the terminal receives the UPSS sent by the network device, to determine whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH.

It can be learned that, according to the communication method provided in this application, when determining that the network device meets the enabling condition, the network device sends the UPSS configuration information to the terminal, so that the terminal activates the UPSS configuration after receiving the UPSS configuration information. After determining that the terminal has activated the UPSS configuration, the network device may determine, based on the service arrival status, the service delay requirement, the UE power saving policy, or the like, whether to send the UPSS to the terminal. Correspondingly, the terminal may determine, depending on whether the UPSS sent by the network device is received, whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

Figure 4:
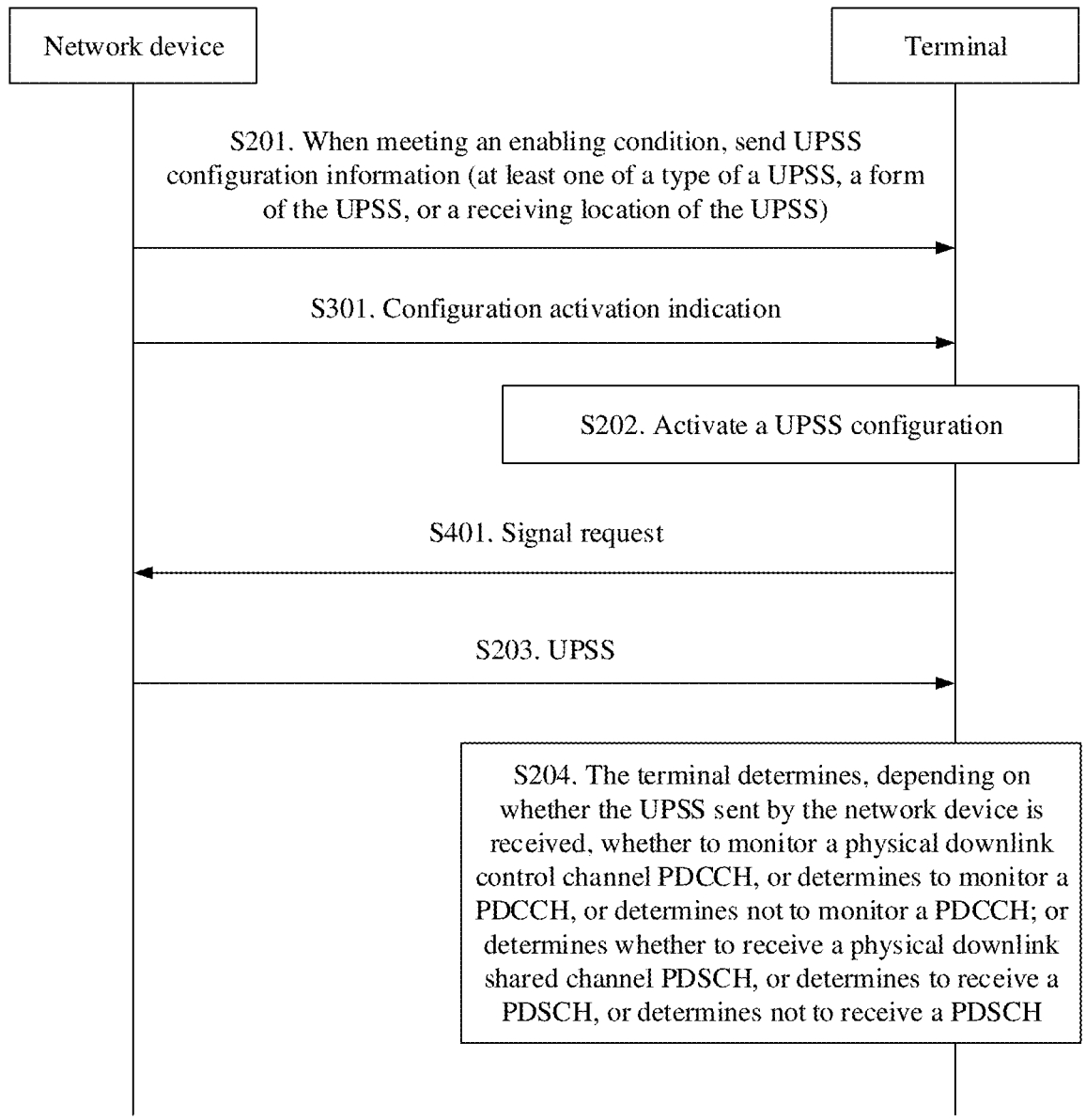
FIG. 4 is a schematic flowchart of still another communication method according to an embodiment of the present invention.

It should be noted that in the embodiment shown in FIG. 2, after determining that the terminal activates the UPSS configuration, the network device directly performs S203 to send the UPSS to the terminal when necessary. Certainly, after determining that the terminal activates the UPSS configuration, the network device may not first send the UPSS to the terminal, but may be triggered by the terminal to send the UPSS to the terminal, that is, after receiving a signal request sent by the terminal. In other words, after S202 is performed, the following S401 may be further included. For example, FIG. 4 is a schematic flowchart of still another communication method according to an embodiment of the present invention.

S401. A terminal sends a signal request to a network device.

The signal request is used to indicate the network device to send a UPSS.

After activating a UPSS configuration, the terminal may send the signal request to the network device, to request the network device to send the UPSS. Correspondingly, after receiving the signal request, the network device may send the UPSS to the terminal, and the terminal may determine whether the UPSS sent by the network device is received, to determine whether to monitor a physical downlink control channel PDCCH, or determine to monitor a PDCCH, or determine not to monitor a PDCCH; or determine whether to receive a physical downlink shared channel PDSCH, or determine to receive a PDSCH, or determine not to receive a PDSCH.

The foregoing describes the communication method provided in the embodiments of the present invention, and the following describes a network device and a terminal provided in the embodiments of the present invention.

Figure 5:
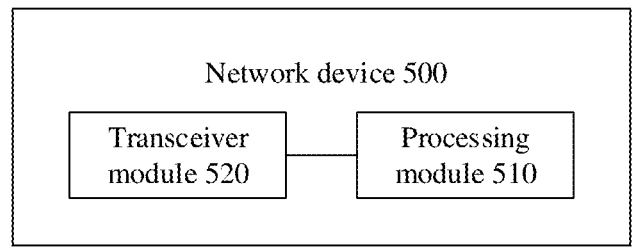
FIG. 5 is a schematic block diagram of a network device according to an embodiment of the present invention.

FIG. 5 is a schematic block diagram of a network device 500 according to an embodiment of the present invention. The network device 500 includes:

a processing module 510, configured to determine whether the network device meets an enabling condition; and a transceiver module 520, configured to: when the network device meets the enabling condition, send configuration information to a terminal, where the configuration information includes at least one of a type of indication information, a form of the indication information, or a receiving location of the indication information, where the transceiver module 520 is further configured to send the indication information to the terminal, where the indication information is used to indicate the terminal whether to monitor a physical downlink control channel PDCCH, or indicate the terminal to monitor a PDCCH, or indicate the terminal not to monitor a PDCCH; or the indication information is used to indicate the terminal whether to receive a physical downlink shared channel PDSCH, or indicate the terminal to receive a PDSCH, or indicate the terminal not to receive a PDSCH.

In this embodiment of this application, when determining that the network device meets the enabling condition, the network device sends UPSS configuration information to the terminal, so that the terminal activates a UPSS configuration after receiving the UPSS configuration information. After determining that the terminal has activated the UPSS configuration, the network device may determine, based on a service arrival status, a service delay requirement, a UE power saving policy, or the like, whether to send a UPSS to the terminal. Correspondingly, when the network device determines to send the UPSS to the terminal, the terminal may determine, depending on whether the UPSS sent by the network device is received, whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

Optionally, in an embodiment, that the processing module 510 is configured to determine whether the network device meets the enabling condition includes:
  the processing module 510 is configured to: when receiving a configuration request sent by the terminal, determine that the network device meets the enabling condition; and/or
  the processing module 510 is configured to: when a service feature meets a preset condition, determine that the network device meets the enabling condition, where the service feature includes a service sending frequency and/or terminal power consumption generated by a service.

Optionally, in an embodiment, when the processing module 510 is configured to determine that the enabling condition met by the network device includes that the configuration request sent by the terminal is received, the configuration request further includes an activation manner of a configuration; and
  that the transceiver module 520 is configured to send the configuration information to the terminal includes:
  the transceiver module 520 is configured to determine a target activation manner based on the activation manner of the configuration, or the activation manner of the configuration and other information, where the other information includes a status of an available network resource; and
  the transceiver module 520 is configured to send the configuration information to the terminal, where the configuration information is further used to indicate the terminal to activate a configuration based on the target activation manner.

Optionally, in an embodiment, the configuration information includes an activation manner of a configuration, and the configuration information is used to indicate the terminal to activate a configuration based on the activation manner of the configuration.

Optionally, in an embodiment, the transceiver module 520 is further configured to send a configuration activation indication to the terminal, where the configuration activation indication is used to indicate the terminal to activate a configuration.

Optionally, in an embodiment, the transceiver module 520 is further configured to receive a signal request sent by the terminal, where the signal request is used to indicate the network device to send the indication information.

It should be understood that the processing module 510 in this embodiment of the present invention may be implemented by a processor or a processor-related circuit component, and the transceiver module 520 may be implemented by a transceiver or a transceiver-related circuit component.

Figure 6:
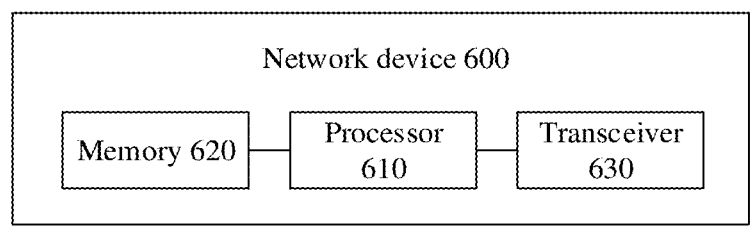
FIG. 6 is another schematic block diagram of a network device according to an embodiment of the present invention.

As shown in FIG. 6, an embodiment of the present invention further provides a network device 600. The network device 600 includes a processor 610, a memory 620, and a transceiver 630. The memory 620 stores an instruction or a program, and the processor 610 is configured to execute the instruction or the program stored in the memory 620. When the instruction or the program stored in the memory 620 is executed, the processor 610 is configured to perform an operation performed by the processing module 510 in the foregoing embodiment, and the transceiver 630 is configured to perform an operation performed by the transceiver module 520 in the foregoing embodiment.

It should be understood that the network device 500 or the network device 600 in the embodiments of this application may correspond to the network device in the communication method in the embodiments of this application, and operations and/or functions of modules in the network device 500 or the network device 600 are separately configured to implement corresponding procedures of the methods in FIG. 2 to FIG. 4. For brevity, details are not described herein again.

Figure 7:
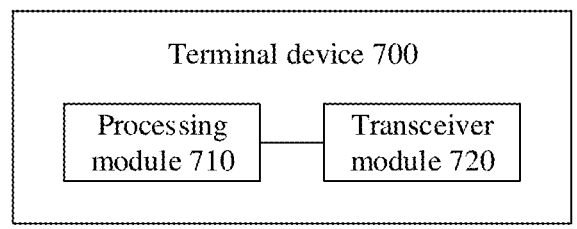
FIG. 7 is a schematic block diagram of a terminal according to an embodiment of the present invention.

FIG. 7 is a schematic block diagram of a terminal 700 according to an embodiment of the present invention. The terminal 700 includes:
  a transceiver module 720, configured to receive configuration information sent by a network device, where the configuration information includes at least one of a type of indication information, a form of the indication information, or a receiving location of the indication information; and
  a processing module 710, configured to activate a configuration, where
  the processing module 710 is further configured to determine, depending on whether the indication information sent by the network device is received, whether to monitor a physical downlink control channel PDCCH, or determine to monitor a PDCCH, or determine not to monitor a PDCCH; or determine whether to receive a physical downlink shared channel PDSCH, or determine to receive a PDSCH, or determine not to receive a PDSCH.

In this embodiment of this application, when determining that the network device meets an enabling condition, the network device sends UPSS configuration information to the terminal, so that the terminal activates a UPSS configuration after receiving the UPSS configuration information. After determining that the terminal has activated the UPSS configuration, the network device may determine, based on a service arrival status, a service delay requirement, a UE power saving policy, or the like, whether to send a UPSS to the terminal. Correspondingly, when the network device determines to send the UPSS to the terminal, the terminal may determine, depending on whether the UPSS sent by the network device is received, whether to monitor the physical downlink control channel PDCCH, or determine to monitor the PDCCH, or determine not to monitor the PDCCH; or determine whether to receive the physical downlink shared channel PDSCH, or determine to receive the PDSCH, or determine not to receive the PDSCH. Compared with a terminal in the conventional technology, the terminal is not always in a state in which a UE power saving mechanism is used. However, when determining that the network device meets the enabling condition, the network device sends the UPSS configuration information to the terminal, so that the terminal activates the UPSS configuration only after receiving the UPSS configuration information, and determines, depending on whether the UPSS sent by the network device is received, whether to monitor the physical downlink control channel PDCCH, or determines to monitor the PDCCH, or determines not to monitor the PDCCH; or determines whether to receive the physical downlink shared channel PDSCH, or determines to receive the PDSCH, or determines not to receive the PDSCH. This improves flexibility of using the UPSS by the terminal.

Optionally, in an embodiment, the configuration information is sent after the network device meets an enabling condition, and that the network device meets the enabling condition includes:

the network device receives a configuration request sent by the terminal; and/or a service feature meets a preset condition, where the service feature includes a service sending frequency and/or terminal power consumption generated by a service.

Optionally, in an embodiment, when the enabling condition met by the network device includes that the network device receives the configuration request sent by the terminal, the configuration request further includes an activation manner of a configuration, and the configuration request is further used to indicate the network device to determine a target activation manner based on the activation manner of the configuration, or the activation manner of the configuration and other information, where the other information includes a status of an available network resource; and correspondingly, that the transceiver module 720 is configured to receive the configuration information sent by the network device further includes:

the transceiver module 720 is configured to receive the configuration information sent by the network device, where the configuration information is further used to indicate the terminal to activate the configuration based on the target activation manner.

Optionally, in an embodiment, the configuration information includes an activation manner of a configuration; and that the processing module 710 is configured to activate the configuration includes:

the processing module 710 is configured to activate the configuration based on the activation manner of the configuration.

Optionally, in an embodiment, that the processing module 710 is configured to activate the configuration includes:

the processing module 710 is configured to receive a configuration activation indication sent by the network device; and the processing module 710 is configured to activate the configuration based on the configuration activation indication.

Optionally, in an embodiment, that the processing module 710 is configured to activate the configuration includes:

the processing module 710 is configured to: once a configuration activation indication sent by the network device is received, or a duration after the configuration information is received reaches a preset duration, activate the configuration.

Optionally, in an embodiment, the transceiver module 720 is further configured to send a signal request to the network device, where the signal request is used to indicate the network device to send the indication information.

It should be understood that the processing module 710 in this embodiment of this application may be implemented by a processor or a processor-related circuit component, and the transceiver module 720 may be implemented by a transceiver or a transceiver-related circuit component.

Figure 8:
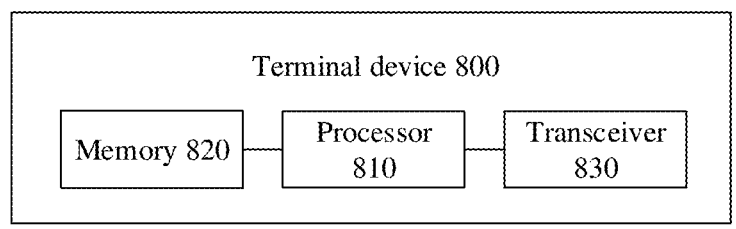
FIG. 8 is another schematic block diagram of a terminal according to an embodiment of the present invention.

As shown in FIG. 8, an embodiment of this application further provides a terminal 800. The terminal 800 includes a processor 810, a memory 820, and a transceiver 830. The memory 820 stores an instruction or a program, and the processor 810 is configured to execute the instruction or the program stored in the memory 820. When the instruction or the program stored in the memory 820 is executed, the processor 810 is configured to perform an operation performed by the processing module 710 in the foregoing embodiment, and the transceiver 830 is configured to perform an operation performed by the transceiver module 720 in the foregoing embodiment.

It should be understood that the terminal 700 or the terminal 800 in the embodiments of this application may correspond to the terminal in the communication method in the embodiments of this application, and operations and/or functions of modules in the terminal 700 or the terminal 800 are separately configured to implement corresponding procedures of the methods in FIG. 2 to FIG. 4. For brevity, details are not described herein again.

An embodiment of this application further provides a computer-readable storage medium. The computer-readable storage medium stores a computer program. When the program is executed by a processor, a procedure related to the network device in the communication method provided in the foregoing method embodiments is implemented.

An embodiment of this application further provides a computer-readable storage medium. The computer-readable storage medium stores a computer program. When the program is executed by a processor, a procedure related to the terminal in the communication method provided in the foregoing method embodiments is implemented.

An embodiment of this application further provides a communications apparatus. The communications apparatus may be a terminal or a circuit. The communications apparatus may be configured to perform an action performed by the terminal in the foregoing method embodiments.

Figure 9:
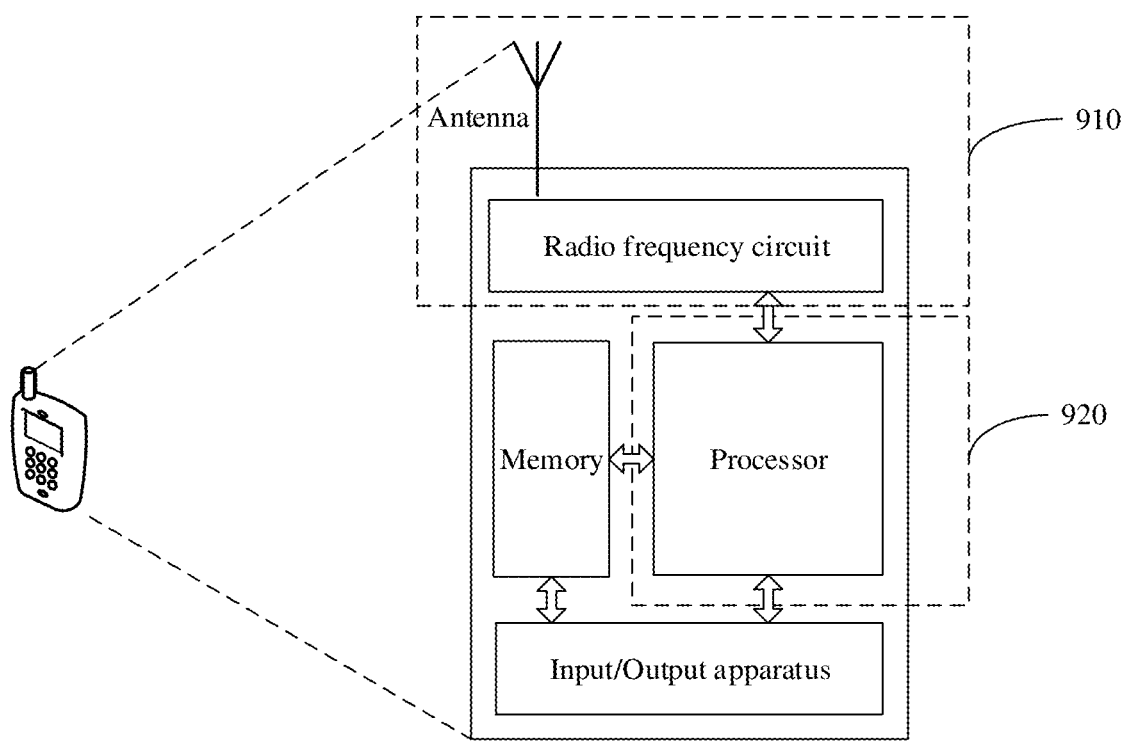
FIG. 9 is a schematic block diagram of a communications apparatus according to an embodiment of this application.

When the communications apparatus is a terminal, FIG. 9 is a simplified schematic structural diagram of the terminal. For ease of understanding and convenience of figure illustration, an example in which the terminal is a mobile phone is used in FIG. 9. As shown in FIG. 9, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display screen, or a keyboard is mainly configured to: receive data entered by a user, and output data to the user. It should be noted that some types of terminals may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 9 shows only one memory and processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, an antenna and a radio frequency circuit that have receiving and sending functions may be considered as a transceiver unit of the terminal, and a processor that has a processing function may be considered as a processing unit of the terminal. As shown in FIG. 9, the terminal includes a transceiver unit 910 and a processing unit 920. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 910 may be considered as a receiving unit, and a component configured to implement a sending function in the transceiver unit 910 may be considered as a sending unit. In other words, the transceiver unit 910 includes the receiving unit and the sending unit. The transceiver unit may also be sometimes referred to as a transceiver machine, transceiver, a transceiver circuit, or the like. The receiving unit may also be sometimes referred to as a receiving machine, a receiver, a receiver circuit, or the like. The sending unit may also be sometimes referred to as a transmitting machine, a transmitter, a transmitter circuit, or the like.

It should be understood that the transceiver unit 910 is configured to perform a sending operation and a receiving operation on a terminal side in the foregoing method embodiments, and the processing unit 920 is configured to perform an operation other than the sending operation and the receiving operation on the terminal in the foregoing method embodiments.

For example, in an implementation, the transceiver unit 910 is configured to perform the receiving operation on the terminal side in step 201 or step 203 in FIG. 2, and/or the transceiver unit 910 is further configured to perform another receiving and sending step on the terminal side in the embodiments of this application. The processing unit 920 is configured to perform step 202 in FIG. 2, and/or the processing unit 920 is further configured to perform another processing step on the terminal side in the embodiments of this application.

For another example, in another implementation, the transceiver unit 910 is configured to perform the receiving operation on the terminal side in step 201, step 301, and step 203 in FIG. 3, and/or the transceiver unit 910 is further configured to perform another receiving and sending step on the terminal side in the embodiments of this application. The processing unit 920 is configured to perform step 202 and step 204 in FIG. 3, and/or the processing unit 920 is further configured to perform another processing step on the terminal side in the embodiments of this application.

For still another example, in still another implementation, the transceiver unit 910 is configured to perform a receiving operation on the terminal side in step 201, step 301, and step 203 in FIG. 4, or a sending operation on the terminal side in step 401, and/or the transceiver unit 910 is further configured to perform another receiving and sending step on the terminal side in the embodiments of this application. The processing unit 920 is configured to perform step 202 and step 204 in FIG. 4, and/or the processing unit 920 is further configured to perform another processing step on the terminal side in the embodiments of this application.

When the communications apparatus of the signal is a chip, the chip includes a transceiver unit and a processing unit. The transceiver unit may be an input/output circuit or a communications interface. The processing unit is a processor, a microprocessor, or an integrated circuit integrated on the chip.

Figure 10:
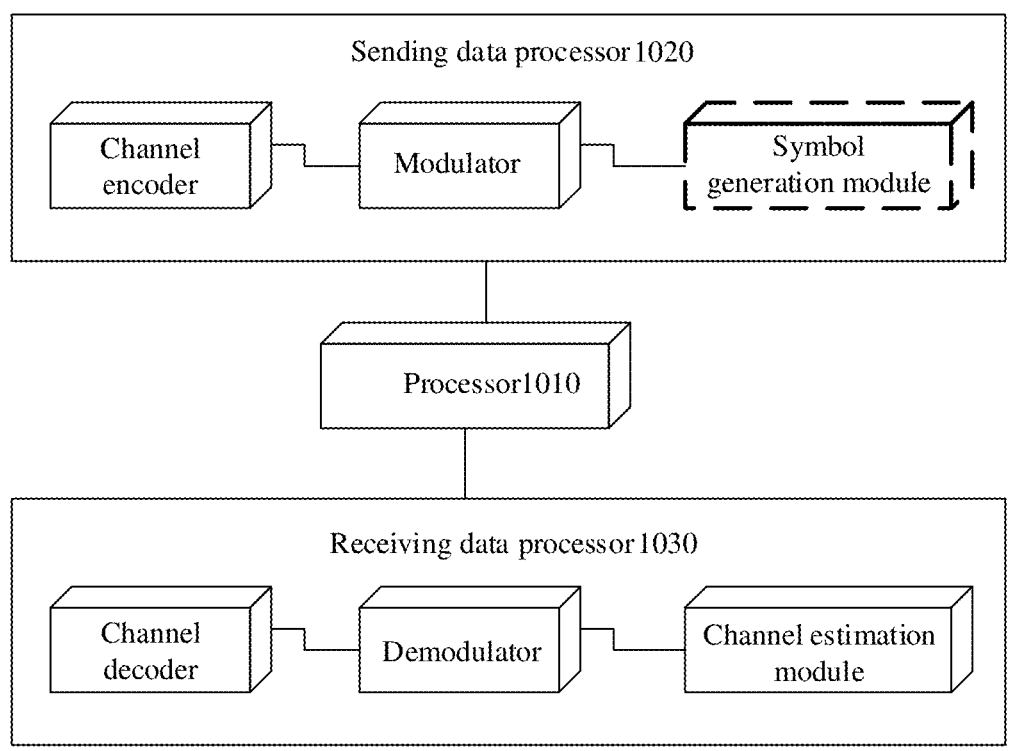
FIG. 10 is another schematic block diagram of a communications apparatus according to an embodiment of this application.

When the communications apparatus of the signal in this embodiment is a terminal, refer to a device shown in FIG. 10. For example, the device may implement a function similar to that of the processor 810 in FIG. 8. In FIG. 10, the device includes a processor 1010, a data sending processor 1020, and a data receiving processor 1030. The processing module 710 in the foregoing embodiment may be the processor 1010 in FIG. 10, and completes a corresponding function. The transceiver module 720 in the foregoing embodiment may be the data sending processor 1020 and/or the data receiving processor 1030 in FIG. 10. Although FIG. 10 shows a channel encoder and a channel decoder, it may be understood that these modules are merely examples, and do not constitute limitative descriptions of this embodiment.

Figure 11:
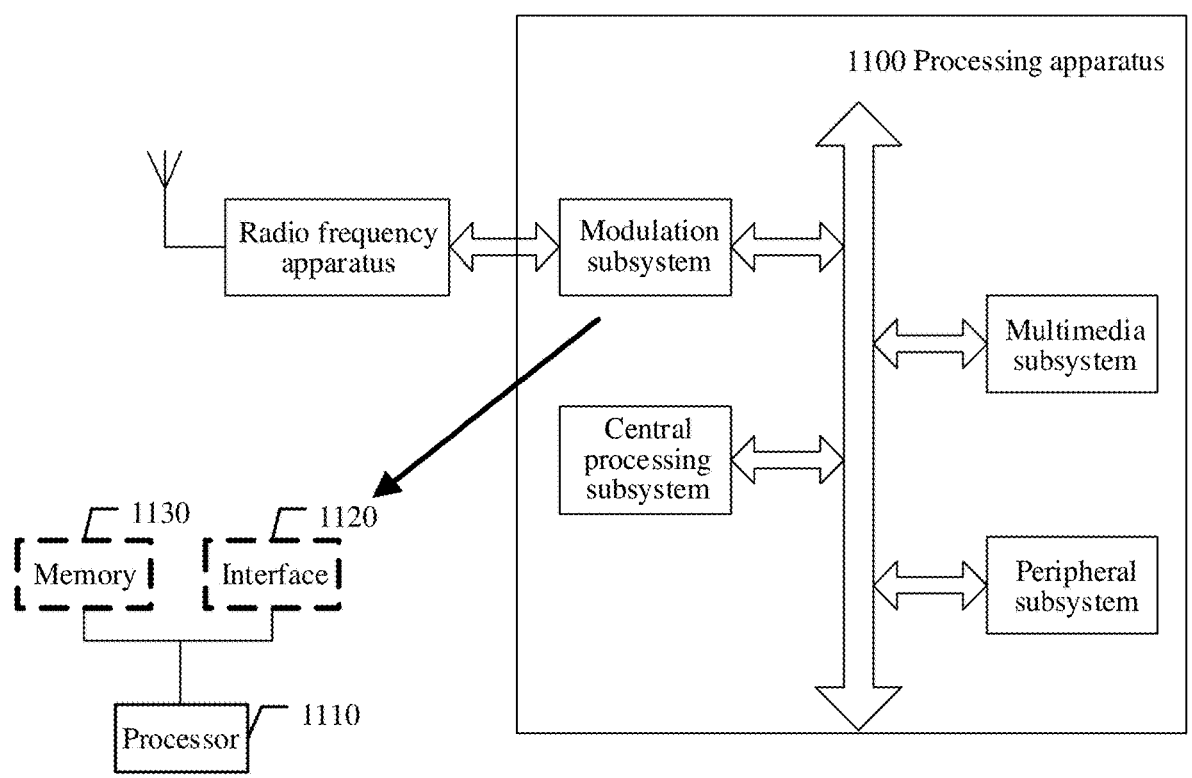
FIG. 11 is still another schematic block diagram of a communications apparatus according to an embodiment of this application.

FIG. 11 shows another form of this embodiment. A processing apparatus 1100 includes modules such as a modulation subsystem, a central processing subsystem, and a peripheral subsystem. The communications apparatus in this embodiment may be used as the modulation subsystem in the processing apparatus 1100. Specifically, the modulation subsystem may include a processor 1101 and an interface 1102. The processor 1101 completes a function of the processing module 710, and the interface 1102 completes a function of the transceiver module 720. In another variation, the modulation subsystem includes a memory 1103, a processor 1101, and a program that is stored in the memory 1103 and is capable of being run on the processor. When executing the program, the processor 1101 implements the method on a terminal side in the foregoing method embodiments. It should be noted that the memory 1103 may be nonvolatile or volatile. The memory 1103 may be located in the modulation subsystem, or may be located in the processing apparatus 1100, provided that the memory 1103 can be connected to the processor 1101.

In another form of this embodiment, a computer-readable storage medium is provided. The computer-readable storage medium stores an indication. When the indication is executed, the method on the network device side in the foregoing method embodiments is performed.

In another form of this embodiment, a computer program product that includes an indication is provided. When the indication is executed, the method on the terminal side in the foregoing method embodiments is performed.

It should be understood that, the processor mentioned in the embodiments of the present invention may be a central processing unit (Central Processing Unit, CPU), or the processor may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, discrete gate, or transistor logical device, a discrete hardware component, or the like. The general-purpose processor may be a microprocessor, or the processor may be any conventional processor or the like.

It should further be understood that the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification is intends to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint of the technical solutions. A person skilled in the art may use different methods to implement a described function for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units, in other words, may be located at one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A communication method, comprising:
   determining, by a network device, whether the network device meets an enabling condition in response to a service feature meeting a preset condition, wherein the service feature comprises a terminal power consumption generated by a service;
   sending, by the network device in response to the network device meeting the enabling condition, configuration information to a terminal, wherein the configuration information comprises at least one of (1) a type of indication information, (2) a form of the indication information, or (3) a receiving location of the indication information; and
   processing, by the terminal, the configuration information received from the network device to determine whether the indication information indicates to the terminal the terminal is to at least one of:
   determine whether to monitor a physical downlink control channel (PDCCH);
   monitor the PDCCH;
   not monitor the PDCCH;
   determine whether to receive a physical downlink shared channel (PDSCH);
   receive the PDSCH; or
   not receive the PDSCH.

2. The method of claim 1, wherein the network device determines whether the network device meets the enabling condition in response to receiving a configuration request from the terminal.

3. The method of claim 2, further comprising:
determining, by the network device in response to receiving the configuration request from the terminal, a target activation manner based on an activation manner of a configuration, or the activation manner of the configuration and other information, wherein the other information comprises a status of an available network resource; and
sending, by the network device, the configuration information to the terminal, wherein the configuration information is used to indicate the terminal to activate the configuration based on the target activation manner.

4. The method of claim 1, further comprising:
activating, at the terminal and responsive to the configuration information, a configuration based on an activation manner of the configuration, wherein the configuration information includes the activation manner of the configuration.

5. The method of claim 1, further comprising:
sending, by the network device, a configuration activation indication to the terminal, wherein the configuration activation indication is used to indicate the terminal to activate a configuration.

6. The method of claim 1, further comprising:
receiving, by the network device before the indication information is sent to the terminal, a signal request from the terminal, wherein the signal request is used to indicate the network device to send the indication information.

7. A communication method, comprising:
processing, by a terminal, configuration information received from a network device, wherein the configuration information is sent by the network device based on a determination that the network device meets an enabling condition, the network device determines the enabling condition is met in response to a service feature meeting a preset condition, the service feature comprises a terminal power consumption generated by a service, and the configuration information includes at least one of (1) a type of indication information, (2) a form of the indication information, or (3) a receiving location of the indication information;
activating, by the terminal, a configuration based on the configuration information received from the network device; and
determining, based on the indication information, to at least one of:
determine whether to monitor a physical downlink control channel (PDCCH);
monitor the PDCCH;
not monitor the PDCCH;
determine whether to receive a physical downlink shared channel (PDSCH);
receive the PDSCH; or
not receive the PDSCH.

8. The method of claim 7, the network device determines whether the network device meets the enabling condition in response to receiving a configuration request from the terminal.

9. The method of claim 8, further comprising:
determining, by the network device in response to receiving the configuration request from the terminal, a target activation manner based on an activation manner of a configuration included in the configuration request, or the activation manner of the configuration and a status of an available network resource; and
activating, by the terminal, the configuration based on the target activation manner.

10. The method of claim 7, wherein the configuration is activated by the terminal based on an activation manner of the configuration, and the activation manner is included in the configuration information.

11. The method of claim 7, wherein the activating the configuration comprises:
receiving a configuration activation indication from the network device; and
activating the configuration based on the configuration activation indication.

12. The method of claim 7, further comprising:
receiving one of a configuration activation indication from the network device or reaching a preset duration after receiving the configuration information to activate the configuration.

13. The method of claim 7, wherein after the activating the configuration, further comprises:
sending a signal request to the network device, wherein the signal request is used to indicate the network device to send the indication information.

14. A communications apparatus, comprising:
a processor that, upon executing instructions, causes the communications apparatus to:
process configuration information received from a network device, wherein the configuration information is sent by the network device based on a determination that the network device meets an enabling condition, the network device determines the enabling condition is met in response to a service feature meeting a preset condition, the service feature comprises a terminal power consumption generated by a service, and the configuration information includes at least one of (1) a type of indication information, (2) a form of the indication information, or (3) a receiving location of the indication information;
activate a configuration based on the configuration information received from the network device; and
determine, based on the indication information, to at least one of:
determine whether to monitor a physical downlink control channel (PDCCH);
monitor the PDCCH;
not monitor the PDCCH;
determine whether to receive a physical downlink shared channel (PDSCH);
receive the PDSCH; or
not receive the PDSCH.

15. The communications apparatus of claim 14, wherein the network device determines whether the network device meets the enabling condition in response to the network device receiving a configuration request from the communications apparatus.

16. The communications apparatus of claim 15, wherein the configuration request includes an activation manner of the configuration, and the configuration request is further used to indicate the network device to determine a target activation manner based on the activation manner of the configuration, or the activation manner of the configuration and a status of an available network resource, and
the communications apparatus is further caused to:
activate the configuration based on the target activation manner.

17. The communications apparatus of claim 14, wherein the configuration information includes an activation manner of the configuration, and the configuration is activated based on the activation manner of the configuration.

18. The communications apparatus of claim 14, wherein the communications apparatus is further caused to:
   receive a configuration activation indication from the network device; and
   activate the configuration based on the configuration activation indication.

19. The communications apparatus of claim 14, wherein the communications apparatus is further caused to activate the configuration in response to receiving a configuration activation indication from the network device, or in response to a preset duration after the configuration information is received being reached.

20. The communications apparatus of claim 14, wherein the communications apparatus is further caused to:
   send a signal request to the network device, wherein the signal request is used to indicate the network device to send the indication information.

* * * * *